United States Patent [19]

Watson

[11] Patent Number: 4,921,394
[45] Date of Patent: May 1, 1990

[54] LOAD HANDLING DEVICE

[75] Inventor: Norman F. Watson, Chipperfield, United Kingdom

[73] Assignee: EKA Limited, Edinburgh, Scotland

[21] Appl. No.: 223,171

[22] Filed: Jul. 22, 1988

[30] Foreign Application Priority Data

Jul. 24, 1987 [GB] United Kingdom ............... 8717563

[51] Int. Cl.$^5$ ............................................. B60P 1/48
[52] U.S. Cl. ..................... 414/546; 212/258; 212/259; 212/189; 414/547; 414/708
[58] Field of Search ............. 414/546, 539, 547, 552, 414/551, 553, 554, 555, 345, 346, 343, 734, 738, 743, 10, 12, 498, 718, 917, 708; 212/258, 261, 259, 189

[56] References Cited

U.S. PATENT DOCUMENTS

| | | | |
|---|---|---|---|
| 3,179,120 | 4/1965 | Erickson et al. | 414/708 X |
| 3,405,824 | 10/1968 | Tweedale | 414/708 X |
| 3,685,673 | 8/1972 | Schweis | 212/258 X |
| 3,726,421 | 4/1973 | Goldhofer | 414/547 |
| 3,774,789 | 11/1973 | Klaus et al. | 414/546 |
| 3,780,877 | 12/1973 | Levitt | 212/259 X |
| 4,619,369 | 10/1986 | Mertens | 212/189 |

FOREIGN PATENT DOCUMENTS 2014986 10/1971 Fed. Rep. of Germany ...... 414/546

Primary Examiner—Frank E. Werner
Attorney, Agent, or Firm—Cumpston & Shaw

[57] ABSTRACT

A load handling device for transferring ISO flat racks, containers or the like, to and from a support comprising two spaced lifting arms (11) pivotally connected adjacent their lower ends (at 9) to said support (13) and hydraulic rams (40,41) for rocking said arms (11) in a vertical arc, and an extension arm (53) pivotally connected to the end of each lifting arm (11) remote from its pivotal connection (9) to the support (13) and further hydraulic rams (55,57) for rocking each extension arm (53) about its pivotal connection to its lifting arm (11) through a vertical arc extending to either side of the longitudinal axis of the lifting arm (11). Preferably, the various hydraulic rams are connected to the lifting and guide arms outboard of the arms, and the extension arms are extendable, and the whole device is fitted to a vehicle chassis, thus enabling flat racks, containers and the like to be transferred between the ground, the vehicle or another vehicle, including a railway wagon, without the railway overhead power lines being hit.

32 Claims, 3 Drawing Sheets

LOAD HANDLING DEVICE

This invention relates to a load handling device which has been specifically designed for handling ISO flat racks but which could equally easily be used for handling ISO containers or other loads.

The load handling device has been specifically designed for mounting on a vehicle chassis, e.g. the rear of a flat bed lorry or on the trailer of an articulated vehicle, but it could be mounted on a different support and it is even envisaged that it could be mounted on an ISO flat rack which itself could then be secured to a vehicle.

The load handling device has been designed specifically for military purposes for handling flat racks containing ammunition or other stores and is especially useful for transferring flat racks from rail cars to a vehicle or vice-versa or between the ground and a rail car or vehicle or any combination thereof.

Nowadays, with the majority of railway systems incorporating overhead electric wires, great care has to be taken when transferring loads onto or from rail cars to ensure that the wires are not touched during a transfer operation. However, it is important for load handling devices performing the transfer operations to have a large reach and yet if they are used for military purposes they must be kept as compact as possible so that they are not easily visible to an enemy in the field and also so that they can be transported, e.g. in air freight transport, without too much difficulty.

According to the present invention, we provide a load handling device for transferring ISO flat racks, containers or the like for example to and from a support for the load handling device, said device comprising two spaced lifing arms pivotally connected at or adjacent their lower ends to said support and means for rocking said arms in a vertical arc and an extension arm pivotally connected to the end of each lifting arm remote from its pivotal connection to the support and further means for rocking each extension arm about its pivotal connection to its lifting arm through a vertical arc exatending to either side of the longitudinal axis of the lifting arm.

Preferably, each extension arm is longitudinally extendable.

Preferably, the support comprises a modified vehicle chassis and one lifting arm is pivotally connected to the chassis at its rear end and the other at or adjacent its forward end.

Preferably, front and rear extendable stabilisers are provided on the chassis. The stabilisers may be of largely standard construction with laterally extending telescopic arms to the extendable parts of each of which a generally vertically extendable leg is attached, which supports a pressure shoe.

Preferably, the means for rocking each lifting arm comprises two hydraulic rams, the lower ends of which are pivotally connected to said support about pivot axes parallel to that connecting the lifting arm to the support but laterally spaced to either side thereof and the upper ends of which are pivotally connected to an upper end portion of the lifting arm.

Preferably, the pivotal connections on the upper end portion of each lifting arm are spaced laterally outwards from the longitudinal axis of the lifting arm to either side thereof.

Preferably, the further means for rocking each extension arm relative to its lifting arm comprises a pair of hydraulic rams, one being located on either side of the lifting arm and each having one end thereof pivotally connected to an upper region of a fixed length portion of the extension arm.

Preferably, each of the pivotal connections joining the respective hydraulic rams to the respective arms are located outboard of the arms.

It is preferred that a generally trapezium shaped plate is connected to each lifting arm towards its upper end with the short parallel side of the trapezium nearer the upper end of the arm than the longer parallel side, with the pivot points for the rams controlling rocking movement of the lifting arm being located adjacent the two upper corners of the trapezium shaped plate and the pivot points for the rams controlling the extension arms being locataed adjacent the lower corners thereof.

Preferably, an inverted triangular plate is connected to the fixed length portion of each extension arm adjacent its end remote from its pivotal connection to its lifting arm and the pivot points connecting the rams for controlling its rocking movement relative to the lifting arm are located adjacent respective upper corners of said triangular plate. A load handling device according to a preferred embodiment of the invention is now described by way of example with reference to the accompanying drawings, in which.

Figure 1:
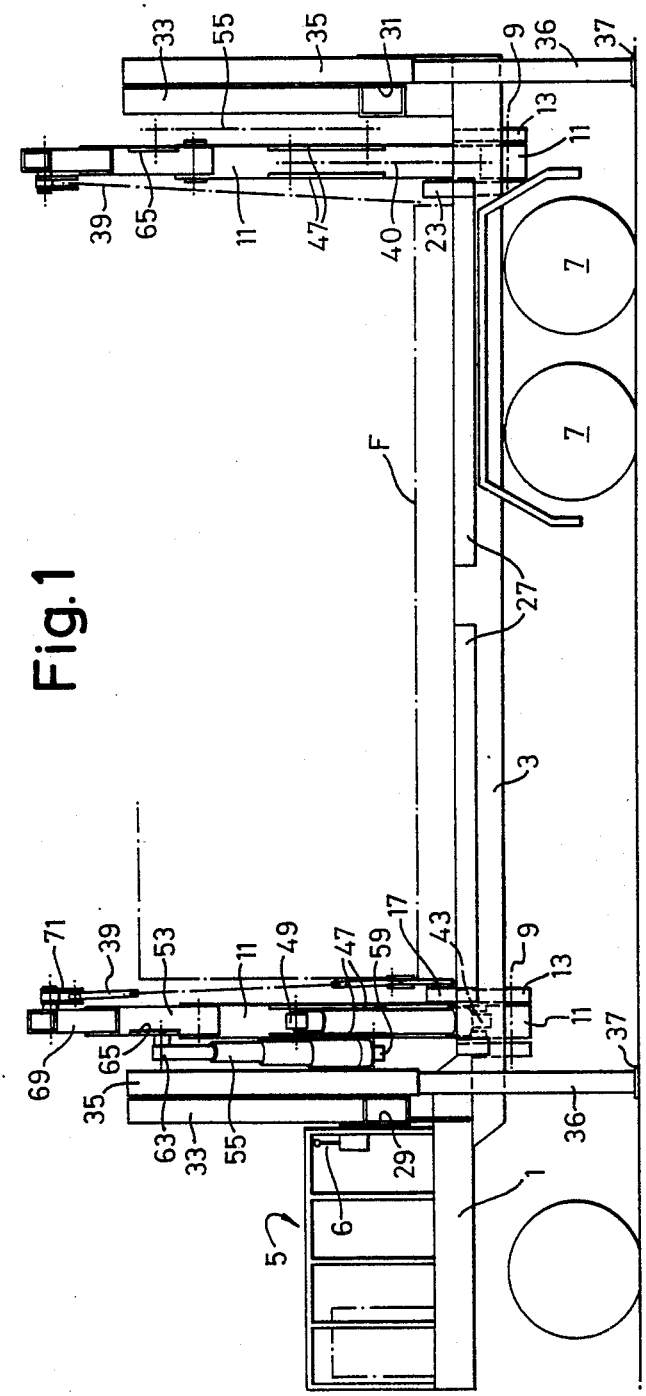
FIG. 1 is a side view of a trailer of an articulated vehicle fitted with a load handling device and showing arms of the load handling device extended to the left hand side of the trailer.

Referring to the drawings, the vehicle trailer illustrated is of generally standard construction but with stepped longitudinally extending chassis members 1 and 3. The upper chassis members 1 support a fifth wheel coupling (not shown) and various enclosures/compartments 5 for hydraulic fluid, a hydraulic motor, tools, and a hydraulic control console, etc. The lower chassis members 3 support the axles for the rear wheels 7 and enable pivot axes 9 for the main lifting arms 11 of the load handling device to be kept as low as possible. The arms 11 are pivotally connected to the chassis between two transverse support plates 13, one pair extending between the front and another between the rear ends of the chassis members 3. The chassis is of generally ladder construction with a pluratlity of spaced frame members extending between the longitudinal members 3. Suitable transverse beams 17 and 23 are located adjacent the front and rear ends respectively, and suitable diagonal bracing members 27 are also provided.

Towards the front of the support chassis are two transverse box sectioned beams 29 and 31 housing extendable further box sectioned beams 30 and 32 which, when extended, act as stabiliser arms. On each free end of the extendable arms 30 and 32 there is a further inclined but generally vertically extending box beam 33, 35 which house respectively extendable stabiliser legs 36 having a support shoe 37 on their lower end. Identical stabiliser arms are also provided to the rear of the chassis. At least the vertically extendable legs 36 may be hydraulically operated.

The load handling device has one main lifting arm 11 located towards the front of the chassis members 3 and another towards the rear thereof and since these arms and all their associated control equipment and extension arms pivotally connected thereto are substantially identical, only one will be described in detail.

The arms are so located that an ISO container or flat rack will fit onto the vehicle chassis between the two and for this purpose the chassis is provided with normal ISO container twist locks for securing the container or flat rack to the chassis. There is of course just sufficient room between the rear of the forward lifting arm 11 and the front of the rear lifting arm 11 for suitable lifting slings 38 and shoes to be connected to bottom corner castings of the container or flat rack.

Pivotal movement of each lifting arm 11 is controlled by hydraulic rams 40 and 41, the fixed portions of which are pivotally connected to the support at 43, 45 respectively. The free end of the extendable portion of each ram 40, 41 is pivotally connected to a respective upper corner of a generally trapezium shaped plate 47 secured to the arm 11 at 49, 51 respectively.

An extension arm 53 is pivotally connected to the upper end of the lifting arm 11 for rocking movement in a vertical plane to either side of the longitudinal axis of the arm 11 under the control of two further hydraulic rams 55, 57. The lower ends of the fixed portions of the rams 55 and 57 are pivotally connected to the lower corners of the plate 47 at points 59, 61 respectively, each ram being of the multi-extending type, and the free end of the extedable portion of the ram 55 is pivotally connected at 63 to an upper corner of an inverted triangular plate 65 secured to the extension arm 53, whereas the free end of the extendable portion of the ram 57 is pivotally connected to the other upper corner of the plate 65 at 67. The arm 53 is itself extendable under the control of the hydraulic ram (not shown), the extendable part being shown at 69 and having the lifting sling 38 connected to it by a suitable connector device 71.

Figure 2:
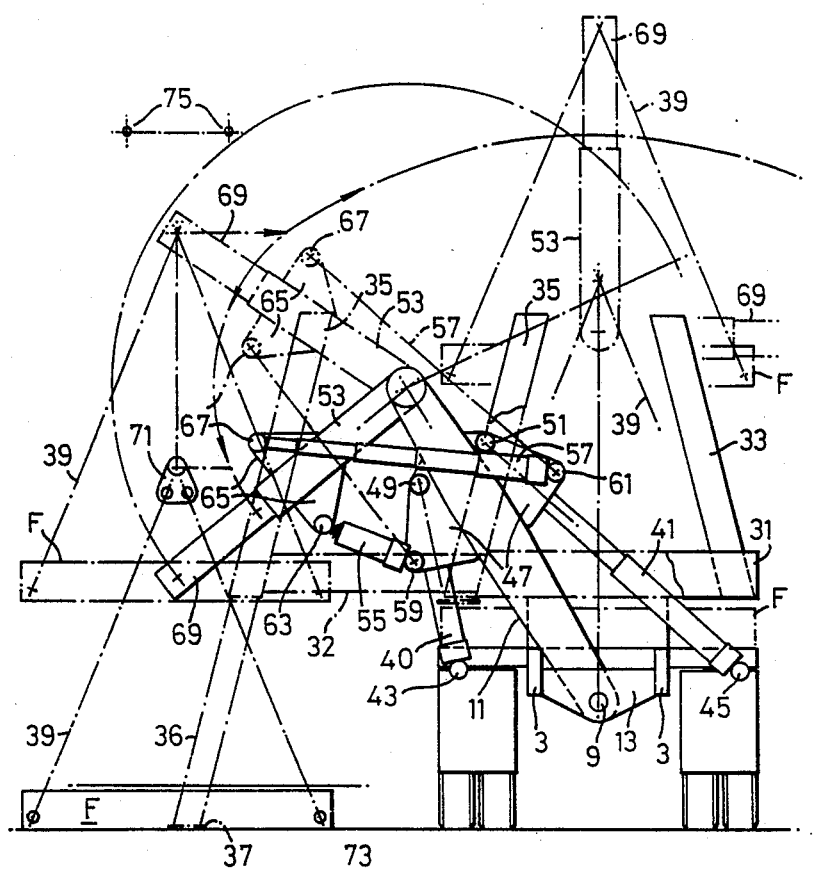
FIG. 2 is a rear end view of the trailer of FIG. 1.
Figure 3:
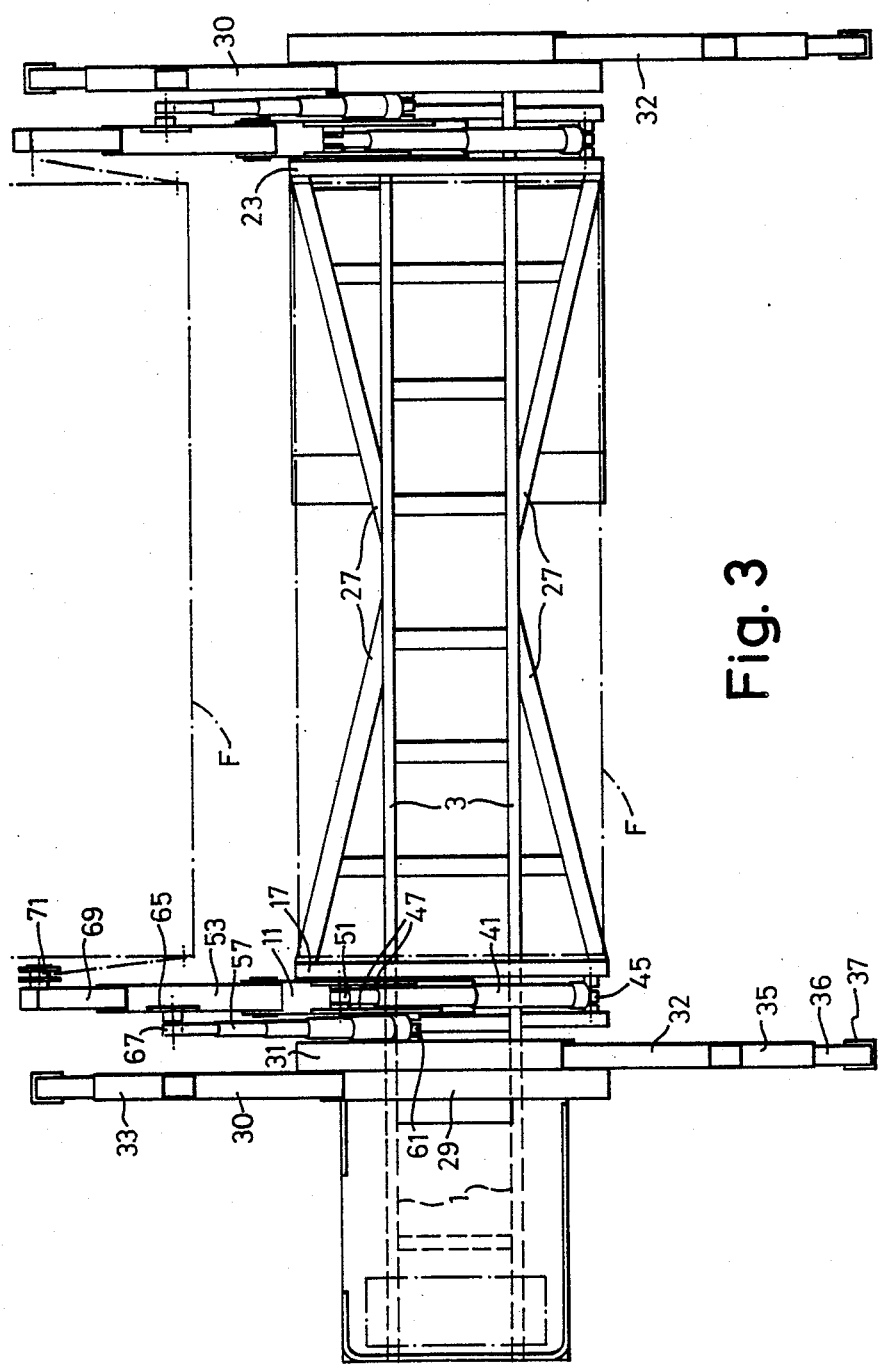
FIG. 3 is a plan view of the trailer of FIGS. 1 and 2 but showing the arms extended to the right hand side.

The various different possible positions of the lifting arm and extendable arm 53 and the hydraulic rams for controlling them are shown either in full or outline position in FIG. 2, as are the various different possible positions to which or from which the lifting and exendable arms can move a flat rack F. FIG. 2 shows how the load handling device can be used to transfer flat racks to and from a rail car, the level of the rails being shown at 73 and the location of the overhead electric wires being shown at 75. Suitable automatic limiting devices are incorporated in the controls for the lifting and extension arms to ensure that the extendable portion 69 of the extension arm 53 cannot touch the overhead wires 75 and to maintaim arm extension to the most suitable arrnagement, so as not to overload any arm, or the hydraulic equipment, and to maintain optimum stability and hence safety.

Although the load handling device has been shown mounted on a trailer of an articulated vehicle, it will be appreciated that it could be mounted on other types of vehicle. Furthermore, it is even envisaged that it could be connected on a flat bed which itself could then be mounted on a vehicle. The device on which it is mounted could of course be extendable, e.g. a 'trombone' trailer for different sized ISO containers. The device may have its own hydraulic power unit or be designed for connection to a remote power unit.

It will of course be understood that the present invention has been described above purely by way of example, and modifications of detail can be made within the scope of the invention.

I claim:

1. A load handling device mountable on a support for transferring a load, comprising:
    two spaced lifting arms;
    first pivot means pivotally connecting said lifting arms to said support at or adjacent a lower end of each arm;
    an exension arm for each lifting arm;
    load engagement means attached to the extension arm;
    second pivot means pivotally connecting said extension arm to an end of its respective lifting arm remote from said first pivot means;
    first means for rocking each of said two lifting arms in a vertical arc comprising:
        two first hydraulic rams;
        third pivot means connecting the lower ends of each of said first hydraulic rams to said support about pivot axes parallel to said first pivot means, but laterally spaced to either side thereof; and
        fourth pivot means connecting the upper ends of said first hydraulic rams to an upper end portion of the respective lifting arm;
    second means for rocking each extension arm about its pivotal connection to its said lifting arm through a vertical arc extending to either side of the longitudinal axis of said lifting arm comprising:
        two second hydraulic rams, one being located on either side of its respective lifting arm;
        fifth pivot means connecting an upper end of each second hydraulic ram to an upper region of its extension arm, each said fifth pivot means being located at or on either side of the longitudinal axis of said extension arm; and
        sixth pivot means connecting a lower end of each second hydraulic ram to its respective lifting arm, said sixth pivot means located closer to said first pivot means than is said fourth pivot means.

2. A loading device according to claim 1, wherein said support comprises a modified vehicle chassis and one lifting arm is pivotally connected to the chassis at its rear end and the other lifting arm is pivotally connected to said support at or adjacent a forward end.

3. A load handling device according to claim 2 further comprising front and rear extendable stabilizers on said chassis.

4. A load handling device according to claim 1 further comprising a telescopically extendable extension part on each extension arm; and
    means to extend and retract said telescopically extendable extension part of said extension arm.

5. A load handling device according to claim 4 further comprising an automatic limiting device for ensuring that the extendable portion of said extension arm does not touch an overhead power line during a load handling operation.

6. A load handling device according to claim 1 wherein said fourth pivot means are spaced laterally outwards from the longitudinal axis of said lifting arm to each side thereof.

7. A load handling device according to claim 1 wherein each of said first and second pivot means joining the respective lifting and extension arms are located outboard of said arms.

8. A load handling device according to claim 1 further comprising a plate connected to each lifting arm towards its upper end and wherein said fourth and sixth pivot means are so located on said plate as to occupy the vertices of a trapezium with the shorter of the parallel sides of said trapezium being nearer the upper end of said lifting arm than the longer of the parallel sides, with said fourth pivot means being located at each of the two upper corners of said trapezium, and said sixth pivot means being located at each lower corner of said trapezium.

9. A load handling device according to claim 8 further comprising an inverted triangular plate connected to said extension arm adjacent to an end remote from the second pivot means and wherein said fifth pivot means are located adjacent respective upper corners of said triangular plate.

10. A load handling device according to claim 1, wherein said fifth pivot means and said sixth pivot means are located outboard of their respective arms.

11. A load handling device according to claim 1 wherein said fifth pivot means and said sixth pivot means are spaced laterally outwards from the longitudinal axis of their respective arms to either side thereof.

12. A load handling device according to claim 1 wherein said fourth pivot means are spaced laterally outwards from the longitudinal axis of said lifting arms to either side thereof.

13. A load handling device for transferring freight containers, for example to and from a support for the load handling device, said device comprising:
two spaced lifting arms;
first pivot means pivotally connecting each of said lifting arms at or adjacent their lower ends to said support;
an extension arm for each lifting arm;
load engagement means attached to the extension arm;
second pivot means connecting said extension arm to an end of its respective lifting arm remote from said first pivot means;
a first pair of hydraulic rams for rocking each of said lifting arms in a vertical arc;
third pivot means connecting the lower end of each ram of said first pair of hydraulic rams to said support about a pivot axis parallel to said first pivot means, but laterally spaced, one to either side thereof;
fourth pivot means connecting the upper end of each ram of said first pair of hydraulic rams to an upper end portion of the respective ones of said lifting arms;
a second pair of hydraulic rams for rocking each extension arm about its pivotal connection to its said lifting arm through a vertical arc extending to either side of the longitudinal axis of said lifting arm, one ram of said second pair of hydraulic rams being located on each side of its respective lifting arm, and including fifth pivot means connecting an upper end of each ram of said second pair of rams to an upper region of its said extension arm, each said fifth pivot means being located at or on either side of the longitudinal axis of said extension arm; and a sixth pivot means connecting a lower end of each ram of said second pair of rams to its respective arm; and
wherein said fourth pivot means for said first pair of rams are located above said sixth pivot means for said second pair of rams.

14. A load handling device according to claim 13 wherein said extension arm is extendable, and further comprising means to extend and retract said extendable extension arm.

15. A load handling device according to claim 13 wherein said fourth pivot means for said first pair of hydraulic rams for each lifting arm are spaced laterally outwards from the longitudinal axis of said lifting arm to either side thereof.

16. A load handling device according to claim 13 wherein each of said first and second pivot means joining the respective lifting and extension arms are located outboard of said arms.

17. A load handling device mountable on a support for transferring a load, comprising:
a lifting arm;
first pivot means pivotally connecting said lifting arm to said support at or adjacent a lower end of said arm;
first pivot means pivotally connecting said lifting arm to said support at or adjacent a lower end of said arm;
an extension arm for said lifting arm;
load engagement means attached to the extension arm;
second pivot means pivotally connecting said extension arm to an end of said lifting arm remote from said first pivot means;
first means for rocking said lifting arm in a vertical arc comprising:
two first hydraulic rams;
third pivot means connecting the lower ends of each of said first hydraulic rams to said support about pivot axes parallel to said first pivot means, but laterally spaced to either side thereof; and
fourth pivot means connecting the upper ends of said first hydraulic rams to an upper end portion of said lifting arm;
second means for rocking said extension arm about its pivotal connection to said lifting arm through a vertical arc extending to either side of the longitudinal axis of said lifting arm comprising:
two second hydraulic rams, one being located on either side of said lifting arm;
fifth pivot means connecting an upper end of each second hydraulic ram to an upper region of said extension arm, each said fifth pivot means being located at or on either side of the longitudinal axis of said extension arm; and
sixth pivot means connecting a lower end of each second hydraulic ram to said lifting arm, said sixth pivot means located closer to said first pivot means than is said fourth pivot means.

18. A loading device according to claim 17, wherein said support comprises a modified vehicle chassis and said lifting arm is pivotally connected to the chassis at its rear end.

19. A load handling device according to claim 18 further comprising front and rear extendable stabilizers on said chassis.

20. A load handling device according to claim 17 further comprising a telescopically extendable extension part on said extension arm; and
means to extend and retract said telescopically extendable extension part of said extension arm.

21. A load handling device according to claim 20 further comprising an automatic limiting device for ensuring that the extendable portion of said extension arm does not touch an overhead power line during a load handling operation.

22. A load handling device according to claim 17 wherein said fourth pivot means are spaced laterally outwards from the longitudinal axis of said lifting arm to each side thereof.

23. A load handling device according to claim 17 wherein each of said first and second pivot means joining said lifting and extension arms are located outboard of said arms.

24. A load handling device according to claim 17 further comprising a plate connected to said lifting arm towards its upper end and wherein said fourth and sixth pivot means are so located on said plate as to occupy the vertices of a trapezium with the shorter of the parallel sides of said trapezium being nearer the upper end of said lifting arm than the longer of the parallel sides, with said fourth pivot means being located at each of the two upper corners of said trapezium, and said sixth pivot means being located at each lower corner of said trapezium.

25. A load handling device according to claim 24 further comprising an inverted triangular plate connected to said extension arm adjacent to an end remote from the second pivot means and wherein said fifth pivot means are located adjacent respective upper corners of said triangular plate.

26. A load handling device according to claim 17, wherein said fifth pivot means and said sixth pivot means are located outboard of their respective arms.

27. A load handling device according to claim 17 wherein said fifth pivot means and said sixth pivot means are spaced laterally outwards from the longitudinal axis of their respective arms to either side thereof.

28. A load handling device according to claim 17 wherein said fourth pivot means are spaced laterally outwards from the longitudinal axis of said lifting arm to either side thereof.

29. A load handling device for transferring freight containers, for example to and from a support for the load handling device, said device comprising:
 a lifting arm;
 first pivot means pivotally connecting said lifting arm at of adjacent a lower end to said support;
 an extension arm for said lifting arm;
 load engagement means attached to the extension arm;
 second pivot means connecting said extension arm to an end of said lifting arm remote from said first pivot means;
 a first pair of hydraulic rams for rocking said lifting arm in a vertical arc;
 third pivot means connecting a lower end of each ram of said first pair of hydraulic rams to said support about a pivot axis parallel to said first pivot means, but laterally spaced, one to either side thereof;
 fourth pivot means connecting an upper end of each ram of said first pair of hydraulic rams to an upper end portion of said lifting arm;
 a second pair of hydraulic rams for rocking said extension arm about its pivotal connection to said lifting arm through a vertical arc extending to either side of the longitudinal axis of said lifting arm, one ram of said second pair of hydraulic rams being located on each side of said lifting arm, and including fifth means connecting an upper end of each ram of said second pair of rams to an upper region of said extension arm, each said fifth pivot means being located at or on either side of the longitudinal axis of said extension arm; and a sixth pivot means connecting a lower end of each ram of said second pair of rams to said lifting arm; and
 wherein said fourth pivot means for said first pair of rams are located above said sixth pivot means for said second pair of rams.

30. A load handling device according to claim 29 wherein said extension arm is extendable, and further comprising means to extend and retract said extendable extension arm.

31. A load handling device according to claim 29 wherein said fourth pivot means for said first pair of hydraulic rams for said lifting arm are spaced laterally outwards from the longitudinal axis of said lifting arm to either side thereof.

32. A load handling device according to claim 31 wherein each of said first and second pivot means joining said lifting and extension arms are located outboard of said arms.

* * * * *